US012273969B2

(12) United States Patent
Rodriguez

(10) Patent No.: US 12,273,969 B2
(45) Date of Patent: Apr. 8, 2025

(54) LIGHT FIXTURE WITH EXTERNALLY SELECTABLE INTENSITY OR COLOR TEMPERATURE

(71) Applicant: ABL IP Holding LLC, Atlanta, GA (US)

(72) Inventor: Yan Rodriguez, Suwanee, GA (US)

(73) Assignee: ABL IP Holding LLC, Atlanta, GA (US)

( * ) Notice: Subject to any disclaimer, the term of this patent is extended or adjusted under 35 U.S.C. 154(b) by 817 days.

(21) Appl. No.: 17/091,288

(22) Filed: Nov. 6, 2020

(65) Prior Publication Data

US 2021/0144818 A1 May 13, 2021

Related U.S. Application Data

(60) Provisional application No. 62/932,655, filed on Nov. 8, 2019.

(51) Int. Cl.
*H05B 45/10* (2020.01)
*H05B 45/20* (2020.01)
(Continued)

(52) U.S. Cl.
CPC ............. *H05B 45/10* (2020.01); *H05B 45/20* (2020.01); *H05B 45/325* (2020.01); *H05B 45/40* (2020.01);
(Continued)

(58) Field of Classification Search
CPC ...... H05B 45/10; H05B 45/20; H05B 45/325; H05B 45/40; H05B 47/17; H05B 47/185; H05B 47/19; Y02B 20/40
See application file for complete search history.

(56) References Cited

U.S. PATENT DOCUMENTS 6,201,351 B1 3/2001 Rudolph et al.
6,323,598 B1 11/2001 Guthrie et al.
(Continued)

FOREIGN PATENT DOCUMENTS

CN 106555981 4/2017
EP 2768283 8/2014
EP 2728972 8/2015
JP 2011258517 12/2011
WO 2011084135 7/2011

OTHER PUBLICATIONS

2×4 LED Flat Panel, Cybertech, Main Place Lighting, Available Online at: https://shopmainplacelighting.com/collections/commercial-lighting/products/2-x-4-led-flat-panel-1, Accessed from Internet on May 14, 2019, 3 pages.

(Continued)

*Primary Examiner* — Raymond R Chai
(74) *Attorney, Agent, or Firm* — Kilpatrick Townsend & Stockton LLP

(57) ABSTRACT

An example of a light fixture is configured to receive, manually or wirelessly from and external device, an instruction to update a setting of the light fixture to a selected intensity or a selected color temperature. An instruction received from the external device may override an instruction provided via manual control. The light fixture may include a set of cool light-emitting diodes (LEDs) and a set of warm LEDs. A processing unit of the light fixture may utilize pulse-width modulation to cause the light fixture to emit light having the selected intensity or selected color temperature by implementing a particular duty cycle of a control signal for the cool LEDs and a particular duty cycle of a control signal for the warm LEDs corresponding to the selected intensity or selected color temperature.

20 Claims, 4 Drawing Sheets

(51) Int. Cl.

| | |
|---|---|
| ***H05B 45/325*** | (2020.01) |
| ***H05B 45/40*** | (2020.01) |
| ***H05B 47/17*** | (2020.01) |
| ***H05B 47/185*** | (2020.01) |
| ***H05B 47/19*** | (2020.01) |

(52) U.S. Cl.
CPC ........... *H05B 47/17* (2020.01); *H05B 47/185* (2020.01); *H05B 47/19* (2020.01)

(56) References Cited

U.S. PATENT DOCUMENTS 6,995,355 B2 2/2006 Rains, Jr. et al.
7,014,336 B1 3/2006 Ducharme et al.
7,088,059 B2 8/2006 McKinney et al.
7,135,664 B2 11/2006 Vornsand et al.
7,173,383 B2 2/2007 Vornsand et al.
7,329,998 B2 2/2008 Jungwirth
7,416,312 B1 8/2008 McDermott
7,423,387 B2 9/2008 Robinson et al.
7,497,590 B2 3/2009 Rains, Jr. et al.
7,520,634 B2 4/2009 Ducharme et al.
7,883,239 B2 2/2011 Rains, Jr. et al.
8,172,415 B2 5/2012 Wegh et al.
8,203,260 B2 6/2012 Li et al.
8,228,002 B2 7/2012 Newman, Jr. et al.
RE43,606 E 8/2012 Bruwer
8,317,362 B2 11/2012 Ku et al.
8,373,362 B2 2/2013 Chemel et al.
8,436,549 B2 5/2013 Hasnain
8,598,809 B2 12/2013 Negley et al.
8,633,650 B2 1/2014 Sauerlaender
8,638,045 B2 1/2014 Kunst et al.
8,669,722 B2 3/2014 Yeh et al.
8,710,754 B2 4/2014 Baddela et al.
8,791,642 B2 7/2014 Van De Ven et al.
8,823,289 B2 9/2014 Linz et al.
8,872,438 B2 10/2014 Zhou et al.
8,878,443 B2 11/2014 Luo et al.
8,890,419 B2 11/2014 Stack
8,890,436 B2 11/2014 Chou
8,914,312 B2 12/2014 McLaughlin et al.
8,941,312 B2 1/2015 McRae
8,975,823 B2 3/2015 Yang et al.
9,055,647 B2 6/2015 Sutardja et al.
9,072,149 B2 6/2015 Wu et al.
9,125,271 B2 9/2015 Martins et al.
9,144,131 B2 9/2015 Wray
9,210,760 B2 12/2015 Sanders et al.
9,277,607 B2 3/2016 Ramer et al.
9,289,269 B2 3/2016 Valteau et al.
9,301,359 B2 3/2016 Wray
9,374,876 B2 6/2016 Alpert et al.
9,386,653 B2 7/2016 Kuo et al.
9,414,457 B2 8/2016 Fukuda et al.
9,485,826 B2 11/2016 Bohler et al.
9,538,603 B2 1/2017 Shearer et al.
9,538,604 B2 1/2017 Yadav et al.
9,544,951 B1 1/2017 O'Neil et al.
9,544,969 B2 1/2017 Baddela et al.
9,554,441 B2 1/2017 Sutardja et al.
9,560,710 B2 1/2017 Beijer et al.
9,603,213 B1 3/2017 Suttles et al.
9,665,262 B2 5/2017 Hole
9,719,642 B1 8/2017 Macias
9,730,291 B1 8/2017 Janik et al.
9,801,250 B1 10/2017 Halliwell
9,820,350 B2 11/2017 Pyshos et al.
9,892,693 B1 2/2018 Kumar et al.
9,900,945 B1 2/2018 Janik et al.
9,924,580 B2 * 3/2018 Thompson ............. H05B 47/19
10,091,855 B2 10/2018 Van Winkle
10,117,300 B2 10/2018 Doheny et al.
10,163,405 B2 12/2018 Kumar et al.
10,290,265 B2 5/2019 Kumar et al.
10,292,233 B1 5/2019 Udavant et al.
10,299,335 B2 5/2019 Pyshos et al.
10,299,336 B2 5/2019 Bowen et al.
10,299,337 B1 5/2019 Chen et al.
10,448,471 B1 10/2019 Chowdhury et al.
10,575,380 B2 2/2020 Udavant et al.
10,660,174 B2 5/2020 Huang et al.
10,674,579 B2 6/2020 Bruckner et al.
10,681,784 B2 6/2020 Bruckner et al.
10,856,384 B2 12/2020 Chen et al.
10,874,006 B1 12/2020 Davis et al.
10,904,970 B2 1/2021 Udavant et al.
10,966,306 B1 3/2021 Recker et al.
11,026,307 B2 6/2021 Rodriguez
11,384,910 B1 * 7/2022 Cohen ................... F21V 29/777
11,481,317 B2 * 10/2022 Ramesh .............. G06F 11/1068
2005/0162851 A1 7/2005 Kazar et al.
2005/0243022 A1 11/2005 Negru
2006/0220586 A1 10/2006 Latham
2006/0226795 A1 10/2006 Walter et al.
2006/0238136 A1 10/2006 Johnson, III et al.
2006/0285310 A1 12/2006 Shyu
2007/0159750 A1 7/2007 Peker et al.
2007/0262724 A1 11/2007 Mednik et al.
2008/0130298 A1 6/2008 Negley et al.
2009/0026913 A1 1/2009 Mrakovich
2009/0218960 A1 9/2009 Lyons et al.
2009/0256483 A1 10/2009 Gehman et al.
2010/0097406 A1 4/2010 Zulch
2010/0141175 A1 6/2010 Hasnain et al.
2010/0171633 A1 7/2010 Baker et al.
2010/0207534 A1 8/2010 Dowling et al.
2010/0214764 A1 8/2010 Chaves et al.
2010/0283322 A1 11/2010 Wibben
2010/0308738 A1 12/2010 Shteynberg et al.
2011/0058372 A1 3/2011 Lerman et al.
2011/0062872 A1 3/2011 Jin et al.
2011/0068702 A1 3/2011 Van De Ven et al.
2011/0084615 A1 4/2011 Welten
2011/0115407 A1 5/2011 Wibben et al.
2011/0210678 A1 9/2011 Grajcar
2011/0273495 A1 11/2011 Ward et al.
2011/0316441 A1 12/2011 Huynh
2012/0080944 A1 4/2012 Recker et al.
2012/0081005 A1 4/2012 Lin et al.
2012/0081009 A1 4/2012 Shteynberg et al.
2012/0098460 A1 4/2012 Miyasaka et al.
2012/0242247 A1 9/2012 Hartmann et al.
2012/0253542 A1 10/2012 Nurmi et al.
2012/0286753 A1 11/2012 Zhong et al.
2013/0002167 A1 1/2013 Van De Ven
2013/0021580 A1 1/2013 Morgan et al.
2013/0038222 A1 2/2013 Yeh et al.
2013/0043795 A1 2/2013 Burayez et al.
2013/0049610 A1 2/2013 Chen
2013/0082616 A1 4/2013 Bradford et al.
2013/0140988 A1 6/2013 Maxik et al.
2013/0141013 A1 6/2013 Kodama et al.
2013/0169158 A1 7/2013 He et al.
2013/0200806 A1 8/2013 Chobot
2013/0229125 A1 9/2013 Yan et al.
2013/0249422 A1 9/2013 Kerstens et al.
2013/0249440 A1 9/2013 Doshi et al.
2013/0343052 A1 12/2013 Yen
2014/0001959 A1 1/2014 Motley et al.
2014/0035472 A1 2/2014 Raj et al.
2014/0042920 A1 2/2014 Chou
2014/0184076 A1 7/2014 Murphy
2014/0197750 A1 7/2014 Cash
2014/0210357 A1 7/2014 Yan et al.
2014/0210364 A1 7/2014 Cash et al.
2014/0252967 A1 9/2014 Van De Ven et al.
2014/0312777 A1 10/2014 Shearer et al.
2015/0009666 A1 1/2015 Keng et al.
2015/0097489 A1 4/2015 Wu et al.
2015/0226406 A1 * 8/2015 Lashina ................. H05B 47/11
362/276
2015/0245441 A1 8/2015 McCune, Jr.
2015/0256760 A1 9/2015 Ju et al.

(56) References Cited

U.S. PATENT DOCUMENTS

| | | | | |
|---|---|---|---|---|
| 2015/0351169 | A1 | 12/2015 | Pope et al. | |
| 2015/0359061 | A1 | 12/2015 | Adler | |
| 2016/0007420 | A1 | 1/2016 | Gong et al. | |
| 2016/0098950 | A1 | 4/2016 | Nicholson | |
| 2016/0128155 | A1 | 5/2016 | Petluri et al. | |
| 2016/0323949 | A1 | 11/2016 | Lee | |
| 2016/0352975 | A1 | 12/2016 | Kervec et al. | |
| 2016/0363308 | A1 | 12/2016 | Shum | |
| 2016/0366746 | A1 | 12/2016 | Van De Ven et al. | |
| 2016/0374177 | A1 | 12/2016 | Chen | |
| 2017/0019973 | A1 | 1/2017 | Beck et al. | |
| 2017/0027033 | A1 | 1/2017 | Chobot et al. | |
| 2017/0086265 | A1 | 3/2017 | Akiyama et al. | |
| 2017/0086280 | A1 | 3/2017 | Boomgaarden et al. | |
| 2017/0105129 | A1 | 4/2017 | Teplin et al. | |
| 2017/0135186 | A1 | 5/2017 | O'Neil et al. | |
| 2017/0164440 | A1 | 6/2017 | Hu et al. | |
| 2017/0238392 | A1 | 8/2017 | Shearer et al. | |
| 2017/0354013 | A1 | 12/2017 | DeMayo et al. | |
| 2018/0035510 | A1 | 2/2018 | Doheny et al. | |
| 2018/0103523 | A1 | 4/2018 | Yan et al. | |
| 2018/0116029 | A1 | 4/2018 | Pyshos et al. | |
| 2018/0166026 | A1 | 6/2018 | Kumar et al. | |
| 2018/0242422 | A1 | 8/2018 | Choi et al. | |
| 2018/0249547 | A1 | 8/2018 | Wang et al. | |
| 2018/0288847 | A1* | 10/2018 | Halliwell | F21V 19/006 |
| 2018/0310381 | A1 | 10/2018 | Bowen et al. | |
| 2018/0368218 | A1 | 12/2018 | Petluri et al. | |
| 2018/0368232 | A1 | 12/2018 | Doheny et al. | |
| 2019/0027099 | A1 | 1/2019 | Kumar et al. | |
| 2019/0037663 | A1 | 1/2019 | Van Winkle | |
| 2019/0088213 | A1 | 3/2019 | Kumar et al. | |
| 2019/0090327 | A1 | 3/2019 | Zolotykh et al. | |
| 2019/0141812 | A1 | 5/2019 | Chen | |
| 2019/0191512 | A1 | 6/2019 | Zeng et al. | |
| 2019/0268984 | A1 | 8/2019 | Song et al. | |
| 2019/0268991 | A1 | 8/2019 | Li | |
| 2019/0338895 | A1* | 11/2019 | Jeswani | F21V 23/04 |
| 2019/0394851 | A1 | 12/2019 | Sinphay | |
| 2020/0380563 | A1 | 12/2020 | Shiffert et al. | |
| 2020/0389469 | A1 | 12/2020 | Litichever et al. | |
| 2021/0136888 | A1* | 5/2021 | Vasquez | F21V 23/06 |
| 2021/0282248 | A1* | 9/2021 | Magielse | H05B 47/175 |
| 2022/0003397 | A1* | 1/2022 | Zhang | H05B 45/20 |
| 2022/0046757 | A1 | 2/2022 | Sanders | |

OTHER PUBLICATIONS

3 Inch WarmDim/Tunable White, Aculux, Accessed from Internet on May 15, 2020, 3 pages.

38W LED Panel—Color Selectable, Venture Lighting, Available Online at: https://www.venturelighting.com/led-lighting/indoor-lighting-fixtures/panels-and-troffers/color-selectable-panels/standard-product/pn38592.html, Accessed from Internet on May 14, 2019, 6 pages.

6 IC LED Retrofit Warmdim (TM) Downlight Trim, Juno, Oct. 2012, 2 pages.

Easy Lighting Control, Application Guide, OSRAM, Available Online at: www.osram.com/easy, Apr. 2015, 25 pages.

Human Centric Lighting, Helvar, Intelligent Colour Product Series, Available Online at: helvar.com/second-sun, Dec. 4, 2017, 4 pages.

iW Cove MX Powercore-Premium Interior Linear LED Cove and Accent Luminaire with Intelligent White Light, Philips Lighting, Product Family Leafelet, Jan. 21, 2019, 3 pages.

LED Panel 1230 40W Colour Changeable, Fuzion Lighting, Information sheet, Available online at: http://www.fuzionlighting.com.au/product/led-panel-40-cct, Accessed from Internet on Mar. 19, 2019, 6 pages.

LED Universal Ceiling Fan Light Kit, Hampton Bay, Use and Care Guide, Nov. 7, 2019, 22 pages.

LLP LED Light Panel, Main Place Lighting, Specification Sheet, Available Online at: https://cdn.shopify.com/s/files/1/2048/2207/files/LLP-Specification-Sheet-1.pdf, Accessed from Internet on Mar. 19, 2019, 4 pages.

Noble Pro LED Line Voltage Task Lighting NLLP Series, AFX, Available Online at: www.AFXinc.com, Accessed from Internet at May 13, 2019, 1 page.

Par Lite Led, VariWhite, Coemar, User Manual Version 1.0, Jun. 2011, 19 pages.

ViaCon LED-Products, Trilux Simplify your Light, Available Online at: https://www.trilux.com/en/products/viacon-led/, Accessed from Internet on May 13, 2019, 11 pages.

Warmdim® & Tunable White Adjustable/downlight/wall Wash 1000 Lumen Led 3 Baffle Down Light Trim AX3 WDTW with 3DBAF Trim, Aculux Luminaire, Mar. 20, 2019, 3 pages.

Biery et al., Controlling LEDs, Lutron Electronics Corporation Incorporated, May 2014, 20 pages.

Sun, Challenges and Opportunities for High Power White LED Development, DOE SSL R&D Workshop, Feb. 1, 2012, pp. 1-12.

U.S. Appl. No. 17/412,876 , Notice of Allowance, Mailed On Nov. 30, 2022, 9 pages.

* cited by examiner

LIGHT FIXTURE WITH EXTERNALLY SELECTABLE INTENSITY OR COLOR TEMPERATURE

CROSS-REFERENCE TO RELATED APPLICATIONS

The present disclosure claims priority to U.S. Provisional Application Ser. No. 62/932,655 for "Light Fixture with Externally Selectable Intensity or Color Temperature," filed Nov. 8, 2019, which is incorporated by reference herein in its entirety.

TECHNICAL FIELD

This disclosure relates to light fixtures and, more particularly, to a light fixture whose light intensity and color temperature are externally selectable via a wireless connection, where such external selection overrides a previous manual selection.

BACKGROUND

An installable light fixture may have a manual control connected to switches. The switches control the intensity (i.e., brightness) and color temperature of the light emitted, and the manual control is useable by a technician to manually control the intensity and color temperature of the light by way of the switches. Typically, the intensity and color temperature set by way of the switches are semi-permanent, in that these settings are maintained for an extended period of time, potentially for the life of the light fixture.

SUMMARY

In one implementation, a method described herein for controlling a light fixture includes receiving a first instruction (i.e., a set of inputs) via manual control, where the first instruction indicates an intensity and a color temperature for light emitted by the light fixture. The method further includes setting a first duty cycle of a first control signal for switching a first set of light-emitting diodes (LEDs) having a first color temperature (e.g., a cooler color temperature) to cause the light fixture to emit light having the intensity and the color temperature. The method further includes setting a second duty cycle of a second control signal for switching a second set of LEDs having a second color temperature (e.g., a warmer color temperature) to cause the light fixture to emit light having the intensity and the color temperature. The method further includes receiving a second instruction from an external device via a radio, where the second instruction indicates an updated intensity and an updated color temperature for the light emitted by the light fixture. Additionally, the method includes overriding the first instruction with the second instruction by updating the first duty cycle associated with the first set of LEDs and the second duty cycle associated with the second set of LEDs to cause the light fixture to emit light having the updated intensity and the updated color temperature.

In another implementation, a light fixture described herein includes a manual control, a first set of LEDs having a first color temperature, a second set of LEDs having a second color temperature, a processing unit, and a radio. The manual control is configured to receive a first instruction, where the first instruction indicates an intensity and a color temperature for light emitted by the light fixture. The processing unit is configured to set a first duty cycle of a first control signal for switching the first set of LEDs and a second duty cycle of a second control signal for switching the second set of LEDs to cause the light fixture to emit light having the intensity and the color temperature. The radio is configured to receive a second instruction from an external device via direct wireless communication, where the second instruction indicates an updated intensity and an updated color temperature for the light emitted by the light fixture. The processing unit is further configured to override the first instruction with the second instruction by updating the first duty cycle associated with the set first set of LEDs and the second duty cycle associated with the second set of LEDs to cause the light fixture to emit light having the updated intensity and the updated color temperature.

In yet another implementation, a system described herein includes a light fixture and an instance of an application running on an external device. The light fixture includes a manual control, a first set of LEDs having a first color temperature, a second set of LEDs having a second color temperature, a processing unit, and a radio. The manual control is configured to receive a first instruction, where the first instruction indicates an intensity and a color temperature for light emitted by the light fixture. The processing unit is configured to set a first duty cycle of a first control signal for switching the first set of LEDs and a second duty cycle of a second control signal for switching the second set of LEDs to cause the light fixture to emit light having the intensity and the color temperature. The instance of the application running on the external device is configured to provide to the light fixture a second instruction, where the second instruction indicates an updated intensity and an updated color temperature for light emitted by the light fixture. The light fixture is configured to receive the second instruction via the radio by way of direct wireless communication, and the processing unit is further configured to override the first instruction with the second instruction by updating the first duty cycle associated with the first set of LEDs and the second duty cycle associated with the second set of LEDs to cause the light fixture to emit light having the updated intensity and the updated color temperature.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

For aesthetic or other reasons, the manual controls of a light fixture are typically positioned on a back side of the light fixture, also referred to herein as a fixture. As a result, when the fixture is installed on a wall or in a ceiling, the manual controls are hidden in the wall or ceiling. Thus, a technician can adjust the intensity and color temperature before installing the fixture, but after the installation, it is difficult or impossible to adjust the intensity or color temperature without uninstalling the fixture.

Some implementations of a configuration system described herein enable an external device, such as a smartphone or a control panel, to control the intensity or color temperature (e.g., correlated color temperature (CCT)) of light emitted by a light fixture after installation or when manual controls are otherwise inaccessible. To this end, the light fixture may include a processing unit, a radio, a set of switches, and multiple LEDs. By way of the radio, the processing unit may receive an instruction from an external device, where the instruction indicates that a setting of the fixture should be updated, such as to a desired intensity or color temperature, or both. Such instruction may override a previous setting of the fixture. In some implementations, the processing unit is connected to, and configured to control the switching of power to, a first set of light-emitting diodes (LEDs) having a first color temperature (e.g., cooler) and a second set of LEDs having a second color temperature (e.g., warmer) in the light fixture. Together, the first set of LEDs and the second set of LEDs provide an overall light intensity and color temperature for the light emitted by the fixture. Based on the instruction received, the processing unit may regulate the contribution of the first set of LEDs and the second set of LEDs to cause the light fixture to emit light having the desired light intensity or color temperature as indicated in the instruction.

Thus, implementations described herein enable external control of light intensity or color temperature of a fixture (i.e., of light emitted by the fixture) via Bluetooth or some other wireless communication technique. As a result, it is not necessary to physically uninstall, or partially uninstall, the light fixture to modify the settings, such as light intensity or color temperature, established during installation.

Figure 1:
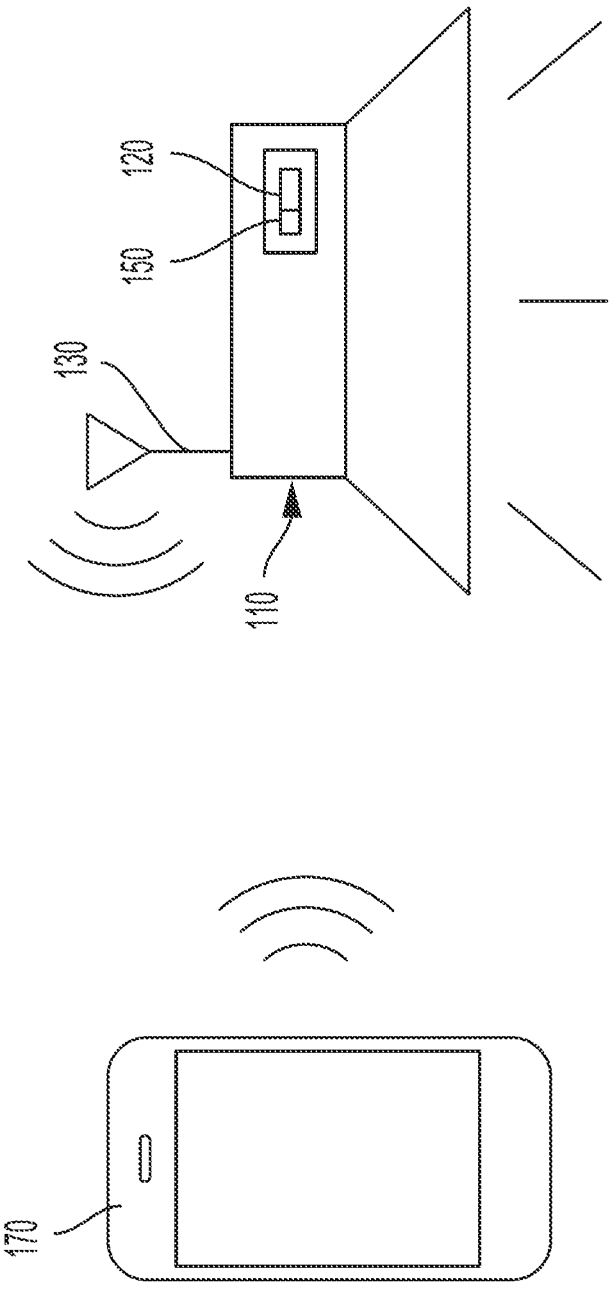
FIG. 1 is a diagram of an example of a configuration system for updating a setting of a light fixture, according to some implementations.

FIG. 1 is a diagram of an example of a configuration system 100 for updating a setting of a light fixture 110, according to some implementations. As shown in FIG. 1, the configuration system 100 includes a light fixture 110, which includes a controller module 120 and a radio 130. The light fixture 110 may be, for example, a downlight such that all or a portion of the light fixture 110 is difficult to access when installed (e.g., in a ceiling). Alternatively, for example, the light fixture 110 may be a sconce installable on a wall such that all or a portion of the light fixture 110 is facing or inside the wall when installed and is thus difficult to access.

The controller module 120 may include a manual control 150 as well as a set of switches (i.e., electrical switches). The manual control 150 may enable manual connection, disconnection, or adjustment of the switches. For instance, the manual control 150 may be on one more mechanical switches, dials, sliders, jumpers, or other devices. As described herein, a user may be enabled to use the manual control 150 to provide an instruction (i.e., a set of inputs), by way of the switches, to the controller module 120 regarding a setting (e.g., intensity or color temperature) of the light fixture 110. However, in some implementations, the manual control 150 is difficult to access when the light fixture 110 is installed. For instance, the manual control 150 may be located on a back or side of the light fixture 110, under a diffuser, under a cover, on a driver box, or in another location that is hidden or to which access is restricted after the fixture 110 is installed.

In some implementations, the controller module 120 is further configured to receive instruction from an external device 170, as shown in FIG. 1. The external device 170 may be a computing device capable of communicating with the controller module 120 via wireless communication. For instance, the external device 170 may be a smartphone or may be a control panel installed on a wall, attached to a wall, or positioned in a room with the light fixture 110 or in a different room. The external device 170 may include a radio configured to communicate with the radio 130 of the light fixture 110. For instance, the external device 170 may communicate with the light fixture 110 via Wireless Fidelity (WiFi) or via a direct communication technique such as Bluetooth (e.g., Bluetooth Low Energy (BLE)) or Near-Field Communication (NFC).

The external device 170 may be configured to transmit to the light fixture 110 an instruction to update a setting of the light fixture 110. For example, an implementation of the configuration system 100 includes an application executable by the external device 170, where the application has an interface configured to receive such an instruction from a user, and where the application instructs the external device 170 to transmit the instruction to the light fixture 110 via radio transmission.

In some implementations, a second light fixture may act as the external device 170 and may transmit, to a light fixture 110 described herein, an instruction to update a setting of such light fixture 110 described herein. Further, although only a single external device 170 is shown, it will be understood that multiple external devices 170 may be in communication with the light fixture 110 and thus may be configured to update the setting of the light fixture 110 as described herein. For each external device 170 from which the light fixture 110 is accepting instructions (e.g., for each external device 170 with which the radio 130 of the light fixture 110 is paired), the controller module 120 may be configured to receive instructions from such external device 170 by way of the radio 130. Further, although only a single light fixture 110 is shown, it will be understood that the external device 170 may be enabled to transmit instructions to update the settings of light fixtures 110.

Figure 2:
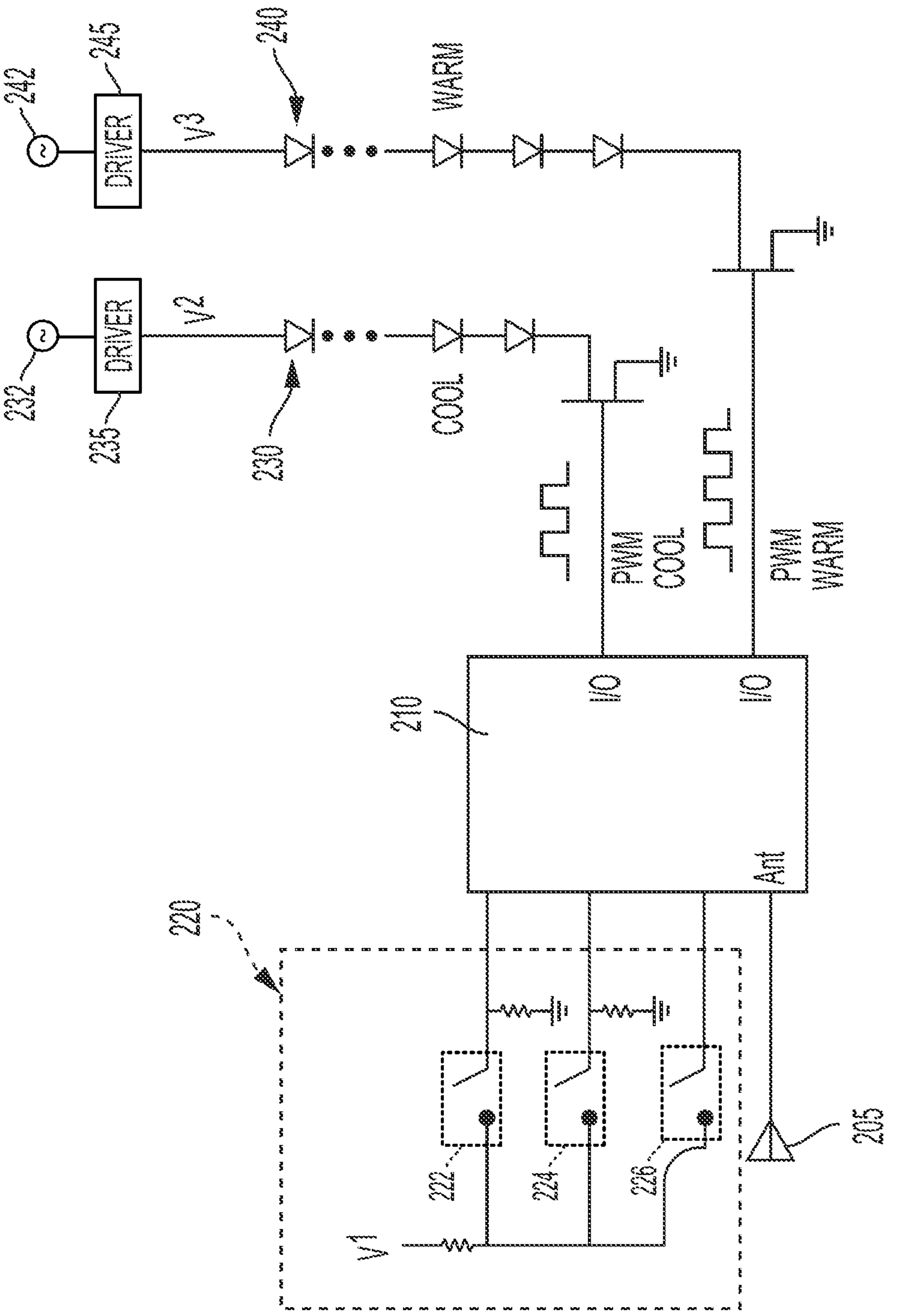
FIG. 2 is a diagram of an example of electrical components of the light fixture, according to some implementations.

FIG. 2 is a diagram of an example of electrical components of the light fixture 110, according to some implementations. In some implementations, the controller module 120 is a specialized computing device configured to receive instructions by way of a transceiver 205 and to modify a setting of the light fixture 110 based on such instructions. As shown in FIG. 2, in addition to the manual control 150 (not shown in FIG. 2), the controller module 120 may further include a processing unit 210 and a set of switches 220. Each switch 220 may be positioned on a respective conductor (e.g., a wire) configured to provide input to the processing unit 210. Through manual manipulation of the manual control 150, a user can adjust the switches 220, thereby providing an instruction to the processing unit 210 as described further below.

In some implementations, the processing unit 210 is a microprocessor with an integrated memory, in which may be stored program code for implementing aspects of the invention performed by the processing unit 210. Additionally or alternatively, the processing unit 210 may be connected to a memory, outside the processing unit 210 itself, in which such program code is stored. The processing unit 210 may be configured to receive instructions to update, or modify, a setting of the light fixture 110. Upon receiving such an instruction, the processing unit 210 may implement such setting of the light fixture 110 as described herein, resulting in the light fixture 110 emitting a light having an intensity or color temperature, or both, indicated in the instruction.

As also shown in FIG. 2, the processing unit 210 may receive, by way of the transceiver 205 of the radio 130, an instruction from the external device 170. More specifically, the processing unit 210 may receive from the external device 170 an instruction to change the setting of the light fixture 110. Additionally or alternatively, the switches 220 may enable a user to manually provide to the processing unit 210 an instruction to change the setting of the light fixture 110. Thus, the processing unit 210 may receive such instructions from the switches 220, the external device 170, or a combination of both.

The set of switches 220 may be manually controlled, by way of the manual control 150, to provide an instruction to the controller module 120. In this example, as shown in FIG. 1, the switches 220 may include an intensity switch 222 and a color temperature switch 224. The intensity switch 222 may represent a selected intensity (e.g., in lumens) of light emitted by the light fixture 110, and the color temperature switch 224 may represent a selected color temperature of the light emitted by the light fixture 110. In some implementations, the intensity switch 222 or the color temperature switch 224 is implemented as, or includes, a potentiometer.

For instance, the manual control 150 corresponding to intensity may be a dial or slider, enabling a user to manually select a level of light intensity. This manual control 150 may be connected to the potentiometer of the intensity switch 222, and thus, selecting a level of light intensity on the manual control 150 may set a resistance level of the potentiometer. Additionally or alternatively, the manual control 150 corresponding to color temperature may be another dial or slider, enabling a user to manually select a color temperature. This manual control 150 may be connected to the potentiometer of the color temperature switch 224, and thus, selecting a color temperature on the manual control 150 may set a resistance level of the potentiometer. In some implementations, a single switch 220 is utilized to represent both intensity and color temperature, rather than there being a distinct intensity switch 222 and color temperature switch 224. Such a single switch 220 may provide a single encoded input to the processing unit 210 to represent both intensity and color temperature, such that the processing unit 210 is configured to interpret the encoded input as a selected intensity and a selected color temperature. Regardless of whether one or multiple switches 220 are used, in some implementations, the manual control 150 is configured to select, and to thus enable selection by a user, from among predefined settings. Each such setting can include an intensity, a color temperature, or both an intensity and color temperature. Thus, a human user can manually make selections regarding the intensity or color temperature of the light fixture 110, and such selections may be represented in the switches 220.

As shown in FIG. 2, in this example, the set of switches 220 may further include a reset switch 226, which may enable or disable external control (e.g., by any external device 170) of the light fixture 110 after such external control has been locked out. For instance, in some implementations, an external device 170 may send a software instruction to the processing unit 210 to lock out further changes to the fixture 110 by external devices 170. This may be advantageous to prevent unauthorized changes to the fixture 110 in a public space. In some implementations, activation of reset switch 226 allows the processing unit 210 to respond once again to instructions received over the radio 130 from external devices 170. Until the reset switch 226 is activated after such a lockout occurs, the processing unit 210 may ignore instructions received over the radio 130. In other words, the reset switch 226 may indicate to the processing unit 210 whether a current setting of the light fixture 110, set based on the switches 220 or otherwise, can be overridden by an external device 170. In some implementations, the processing unit 210 allows external control only when the reset switch 226 is an open state, and in some other implementations, the processing unit 210 allows external control only when the reset switch 226 is in a closed state; in either case, the light fixture 110 (e.g., the processing unit 210) may toggle the reset switch 226 to change its state, thereby causing or removing lockout of external control as needed.

As shown in FIG. 2, the intensity switch 222 may be positioned on a conductor (e.g., a wire) that connects to the processing unit 210. Based on adjustments to the intensity switch 222 made by a user, the processing unit 210 may receive an indication along the conductor reflecting a current state of the intensity switch 222 (i.e., reflecting the level of intensity selected at the switches 220). Analogously, the color temperature switch 224 may be positioned on a conductor (e.g., a wire) that connects to the processing unit 210. Based on adjustments to the color temperature switch 224 made by the user, the processing unit 210 may receive an indication along the conductor reflecting a current state of the color temperature switch 224 (i.e., reflecting the color temperature selected at the switches 220). For instance, the indication received may be an electrical state, such as a certain current or voltage, which the processing unit 210 detects from the conductor. As such, based on the detected electrical state, the processing unit 210 may detect the state of the switches 220 in the controller module 120. Thus, the processing unit 210 may detect when such state changes responsive to a manual change by a user. In some implementations, the processing unit 210 interprets such a change in the state of the switches 220 as an instruction to update the light fixture 110 to a setting indicated in the switches 220, more specifically, to a selected intensity and selected color temperature indicated in the switches 220. As such, when a user adjusts the set of switches 220, the set of switches 220 may provide to the processing unit 210 an indication of the selected intensity and selected color temperature, which the processing unit 210 may interpret as an instruction.

As described above, the processing unit 210 may be configured to receive instructions regarding the setting of the light fixture 110 both from the set of switches 220 and from the external device 170. In some implementations, the processing unit 210 updates the setting of the light fixture 110 upon receiving such an instruction, regardless of whether the instruction is received from the switches 220 or from the external device 170. An instruction from the external device 170 may override a prior instruction, and a prior setting, received from the switches 220; analogously, an instruction from the switches 220 may override a prior instruction, and a prior setting, from the external device 170. In other words, when the current setting of the light fixture 110 is based on an instruction from the switches 220, the light fixture 110 may be deemed to be in manual mode, and the manual mode may be overridden implicitly upon receipt of a new instruction from the external device 170. Analogously, when the current setting of the light fixture 110 is based on an instruction from the external device 170, the light fixture 110 may be deemed to be in external mode, and the external mode may be overridden implicitly upon receive of a new instruction from the switches 220. Additionally or alternatively to the above, in some cases, it may be advantageous to lock out the external mode, which may be done when an external device 170 sends a command to the processing unit 210 requesting such a lock out.

In some implementations, the controller module 120 utilizes pulse-width modulation (PWM) to implement a setting of the light fixture 110. Generally, PWM is a method of regulating the average power delivered by an electrical signal, by turning a switch back and forth between open and closed. The longer the switch is closed (i.e., on) during an interval, the higher is the average power supplied to a load.

To emit light, the light fixture 110 may include a first set of LEDs 230 having a first color temperature and a second set of LEDs 240 having a second color temperature. In some implementations, each set of LEDs has a different overall color temperature as compared to the other set. For instance, the first set of LEDs 230 may have a cooler color temperature than the second set of LEDs 240. Throughout this disclosure, the first set of LEDs 230 are thus referred to as the cool LEDs 230, and the second set of LEDs 240 are referred to as the warm LEDs 240; however, it will be understood that this designation of cool and warm is for illustrative purposes only.

As shown in FIG. 2, the cool LEDs 230 may be powered by a respective power source 232, which provides power to a respective driver 235 for the cool LEDs 230. In some implementations, the driver 235 inputs alternating current (AC) voltage from the power source 232, rectifies the AC voltage, and outputs a DC voltage at a voltage level that is appropriate for the cool LEDs 230. Similarly, as shown, the warm LEDs 240 may be powered by a respective power source 242, which provides power to a respective driver 245 for the warm LEDs 240. In some implementations, the driver 245 inputs AC voltage from the power source 242, rectifies the AC voltage, and outputs a DC voltage at a voltage level that is appropriate for the warm LEDs 240. Although the power sources 232, 242 shown are AC power sources, a DC power source, such as a battery, may additionally or alternatively be used to power the cool LEDs 230 or the warm LEDs 240, or both. Various implementations are possible and are within the scope of this disclosure.

In some implementations, voltage $v^1$ as shown in FIG. 2 is a logic-level voltage such as 3V, and the driver voltages $v^2$ and $v^3$ may be related to the quantity of the respective cool LEDs 230 and warm LEDs 240. For instance, if a string of LEDs (e.g., cool LEDs 230 or warm LEDs 240) includes ten LEDs in series with each LED operating at 3V, then then the respective driver may provide a voltage of 30V. A single power source and driver may be used for two or more strings of LEDs, such as both the cool LEDs 230 and the warm LEDs 240, when each such string requires the same voltage (e.g., has the same quantity of LEDs). In contrast, some implementations utilize a two-channel driver or multiple drivers for strings of LEDs with varying voltage requirements (e.g., different quantities of LEDs). Various implementations are possible and are within the scope of this disclosure.

In some implementations, the intensity and color temperature of the fixture 110 (i.e., of light emitted by the fixture 110) are based on the combined contribution of the cool LEDs 230 and the warm LEDs 240. The cool LEDs 230 may be connected to the processing unit 210 by a first conductor (e.g., a first wire), and the warm LEDs 240 may be connected to the processing unit 210 by a second conductor (e.g., a second wire). Thus, the processing unit 210 may control a first switch (e.g., a Metal Oxide Semiconductor Field Effect Transistor (MOSFET)) to turn on power to the cool LEDs 230 and may control a second switch (e.g., a MOSFET) to turn on power to the warm LEDs 240. Although FIG. 2 shows only a single string of cool LEDs 230 and a single string of warm LEDs 240, various quantities of strings of cool LEDs 230 or warm LEDs 240 may be used in other implementations. Further, various implementations of switching controls are possible and are within the scope of this disclosure.

In some implementations, the duty cycle of a control signal for switching the cool LEDs 230 aggregated with the duty cycle of a control signal for switching the warm LEDs 240 determines the intensity of the light emitted. For instance, the sum of the duty cycles (i.e., the total of the respective on-time percentages of the cool LEDs 230 and the warm LEDs 240) may determine the light intensity. Further, the color temperature of the light may be based on the duty cycle associated with the cool LEDs 230 compared to the duty cycle associated with the warm LEDs 240. In other words, the color temperature may be based on the ratio of the time the cool LEDs 230 are on to the time the warm LEDs 240 are on during the interval. Thus, a particular color temperature may be achieved at various intensities by maintaining the ratio of cool LEDs 230 to warm LEDs 240 during each interval while varying the time during which both the warm LEDs 240 and the cool LEDs 230 are on. In one example, for instance, given a set of cool LEDs 230 with a color temperature of 5000K and a set of warm LEDs 240 with a color temperature of 2700K, a selected setting of 50% brightness (i.e., intensity) at 2700K causes the processing unit 210 to set the warm LEDs 240 at a 50% duty cycle and the cool LEDs 230 at a 0% duty cycle. In another example, given those same cool LEDs 230 and warm LEDs 240, a selected setting of 100% brightness at 3500K causes the processing unit 210 to set the cool LEDs 230 at a 50% duty cycle and the warm LEDs 240 also at a 50% duty cycle. Based on the specific LEDs used for the cool LEDs 230 and the warm LEDs, one of skill in the art will understand which duty cycles are appropriate to cause the light fixture to emit light having an overall desired intensity and color temperature.

In some implementations, the processing unit 210 may maintain, or have access to, a table mapping each permitted pair of intensity and color temperature to a corresponding duty cycle of the control signal for the cool LEDs 230 and a duty cycle of the control signal for the warm LEDs 240, or to some other indication of how long to turn the cool LEDs 230 on and off and how long to turn the warm LEDs 240 on and off. Additionally or alternatively, the processing unit 210 may execute program code implementing a calculation to determine such duty cycles based on the selected intensity and selected color temperature. The processing unit 210 may turn the switch to the cool LEDs 230 on and off as needed and may turn the switch to the warm LEDs 240 on and off as needed to cause the light fixture to emit light having the selected intensity and selected color temperature (e.g., by achieving specific duty cycles).

Thus, in some implementations, upon receiving an instruction to update a setting of the light fixture 110 to a selected intensity or selected color temperature, the processing unit 210 may achieve such selected intensity or selected color temperature in emitted light by regulating the warm LEDs 240 and the cool LEDs 230 using pulse-width modulation. As described above, the processing unit 210 may update the setting each time a new instruction is received.

Thus, an instruction received from an external device 170 may override a prior instruction provided manually at the switches 220, and an instruction received from the switches 220 may override a prior instruction received from an external device 170.

Figure 3:
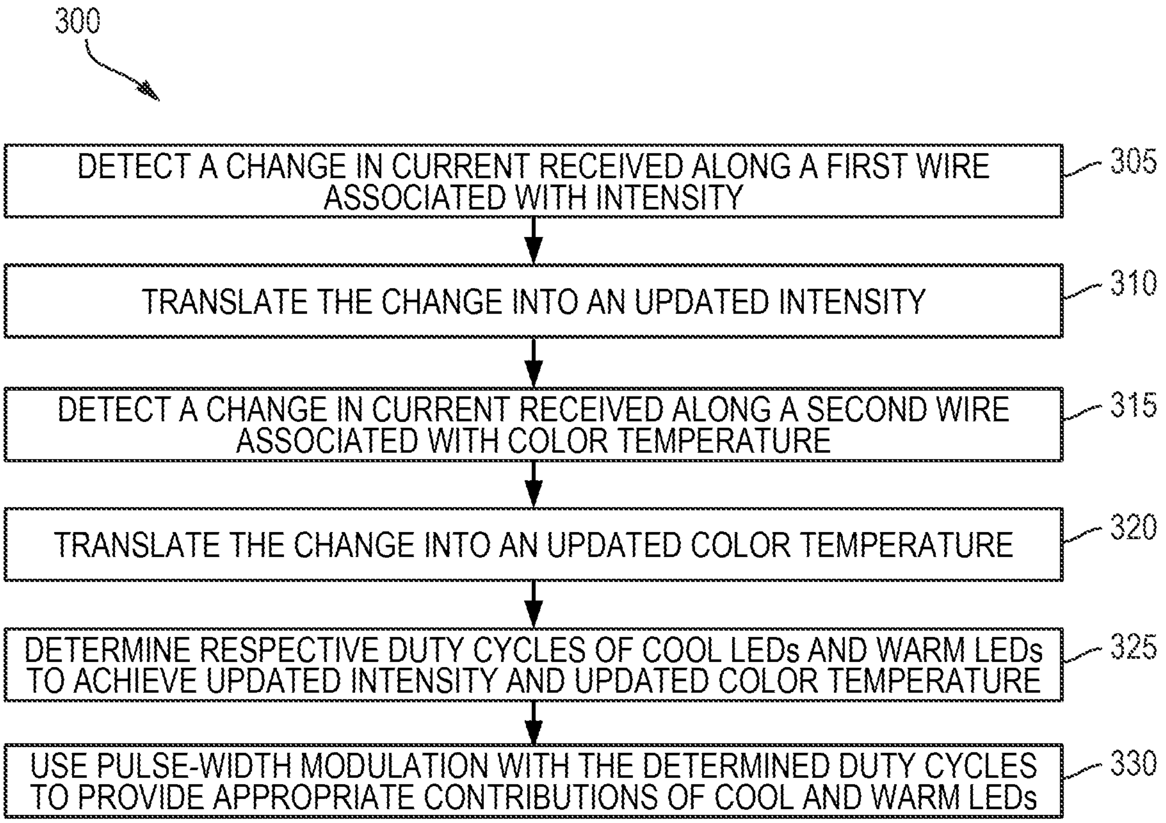
FIG. 3 is a flow diagram of a method of changing a setting of the light fixture based on receiving an instruction to do so via a manual control, according to some implementations described herein.

FIG. 3 is a flow diagram of a method 300 of changing a setting of a light fixture 110 based on receiving an instruction to do so via a manual control 150, according to some implementations described herein. In some implementations, this method 300 or similar is performed by the processing unit 210 upon use of the manual control 150 to change a setting. Further, this method 300 or similar may be performed, upon use of the manual control 150 to change a setting, regardless of whether the intensity or color temperature of the light fixture 110 has been previously set via manual control 150 or external device 170.

The method 300 depicted in FIG. 3 may be implemented in software (e.g., firmware), in hardware, or in a combination software and hardware. For instance, if implemented in software, program code implementing the method 300 may be stored in a computer-readable storage medium, which may be non-transitory, for execution by a processing unit, such as the processing unit 210 described herein. If implemented in hardware, the method 300 may be integrated into a specialized hardware device, such as a field-programmable gate array (FPGA). Various implementations are possible and are within the scope of this disclosure. This method 300 is intended to be illustrative and non-limiting. Although FIG. 3 depicts various activities occurring in a particular sequence or order, this is not intended to be limiting. In certain implementations, for instance, the activities may be performed in a different order, or one or more activities of the method 300 may be performed in parallel.

As shown in FIG. 3, at block 305, the processing unit 210 detects a change in an electrical state (e.g., a change the amount of voltage or current) received along a first conductor (i.e., an intensity conductor), where the first conductor is associated with the intensity of the light emitted by the light fixture 110. In some implementations, the first conductor is connected to an intensity switch 222, which is operable by a manual control 150 associated with intensity. Thus, the change in the electrical state is a result of a manual adjustment to the manual control 150 to change the intensity of the light fixture.

At block 310, the processing unit 210 translates the change in the electrical state of the first conductor to an updated intensity. Various techniques can be used to implement this translation. For instance, the processing unit 210 may utilize a mapping table or a predefined mapping function to translate the electrical state (e.g., the updated voltage or current), as changed, or to translate the change in the electrical state (e.g., the delta between the current and the prior current or the delta between the voltage and the prior voltage) to a value representing the updated intensity (e.g., in lumens). The technique used may have been established based on how adjustment of the manual control actually translates into the electrical state change, which can be determined, for instance, through the manufacturing process of the light fixture 110.

At block 315, the processing unit 210 detects a change in the electrical state of a second conductor (i.e., a color temperature conductor), where the second conductor is associated with the color temperature of the light emitted by the light fixture 110. In some implementations, the second conductor is connected to a color temperature switch 224, which is operable by a manual control 150 associated with color temperature. Thus, the change in the electrical state is a result of a manual adjustment to the manual control 150 to change the color temperature of the light fixture.

At block 320, the processing unit 210 translates the change in the electrical state of the second conductor to an updated color temperature. Various techniques can be used to implement this translation. For instance, the processing unit 210 may utilize a mapping table or a predefined mapping function to translate the electrical state (e.g., the updated voltage or current), as changed, or to translate the change in the electrical state (e.g., the delta between the current and the prior current or the delta between the voltage and the prior voltage) to a value representing desired color temperature (e.g., in Kelvins). The technique used may have been established based on how adjustment of the manual control actually translates into the electrical state change, which can be determined, for instance, through the manufacturing process of the light fixture 110.

As described above, in some implementations, the processing unit 210 detects an electrical state of a first conductor associated with light intensity and of a second conductor associated with color temperature. Additionally or alternatively, however, a single conductor (e.g., a single wire) could be associated with both intensity and color temperature and could be used to represent both intensity and color temperature. In some implementations, in that case, the processing unit 210 maps the change in the electrical state of that single conductor to an updated intensity and to an updated color temperature. Various implementations are possible and are within the scope of this disclosure.

At block 325, given the updated intensity determined at block 310 and the updated color temperature determined at block 320, the processing unit 210 determines respective duty cycles of control signals for the cool LEDs 230 and the warm LEDs 240 of the light fixture 110. In some implementations, the respective duty cycles determine the cool and warm contributions to the light emitted. Although various techniques can be used to determine the respective duty cycles, in some implementations, the processing unit 210 uses a lookup table to map the combination of updated intensity and updated color temperature to respective duty cycles of control signals for switching the set of cool LEDs 230 and for the set of warm LEDs 240.

Additionally or alternatively, some implementations combine the translations (i.e., mappings) performed in blocks 310, 320, and 325 into a single translation. For instance, the processing unit 210 may map the change in the electrical state of the first conductor and the change in the electrical state of the second conductor, or the change in the electrical state of an alternative single conductor representing both intensity and color temperature, into the respective duty cycles associated with the cool LEDs 230 and the warm LEDs 240 without explicitly determining the updated intensity or updated color temperature. In more general terms, the duty cycles are a function of the detected electrical states regardless of whether an intermediate activity of explicitly determining the updated intensity and updated color temperature is performed. That function can be implemented through various techniques, such as through one or more lookup tables or through one or more computations. In implementations in which the updated intensity and the updated color temperature are not explicitly computed, the updated intensity and updated color temperature are still embodied in, and represented by, the duty cycles determined.

At block 330, the processing unit 210 may use pulse-width modulation, given the duty cycles for control signals determined at block 325, to send the respective control signals to the cool LEDs 230 and to the warm LEDs 240 to effect a contribution of the cool LEDs 230 and the warm LEDs 240 that achieves the updated intensity and the updated color temperature as determined at block 310 and block 320 respectively. More specifically, the processing unit 210 varies a first control signal to the cool LEDs 230 in accordance with a first duty cycle associated with the cool LEDs as determined above, and the processing unit 210 varies a second control signal to the warm LEDs 240 in accordance with a second duty cycle associated with the warm LEDs as determined above.

As described above, in some implementations, the processing unit 210 implements pulse-width modulation to provide specific contributions of cool LEDs 230 and warm LEDs 240. However, additional or alternative techniques can be used to provide a desirable average amount of power output that similarly yields desirable contributions of cool LEDs 230 and warm LEDs 240. Various implementations are possible and are within the scope of this disclosure.

Figure 4:
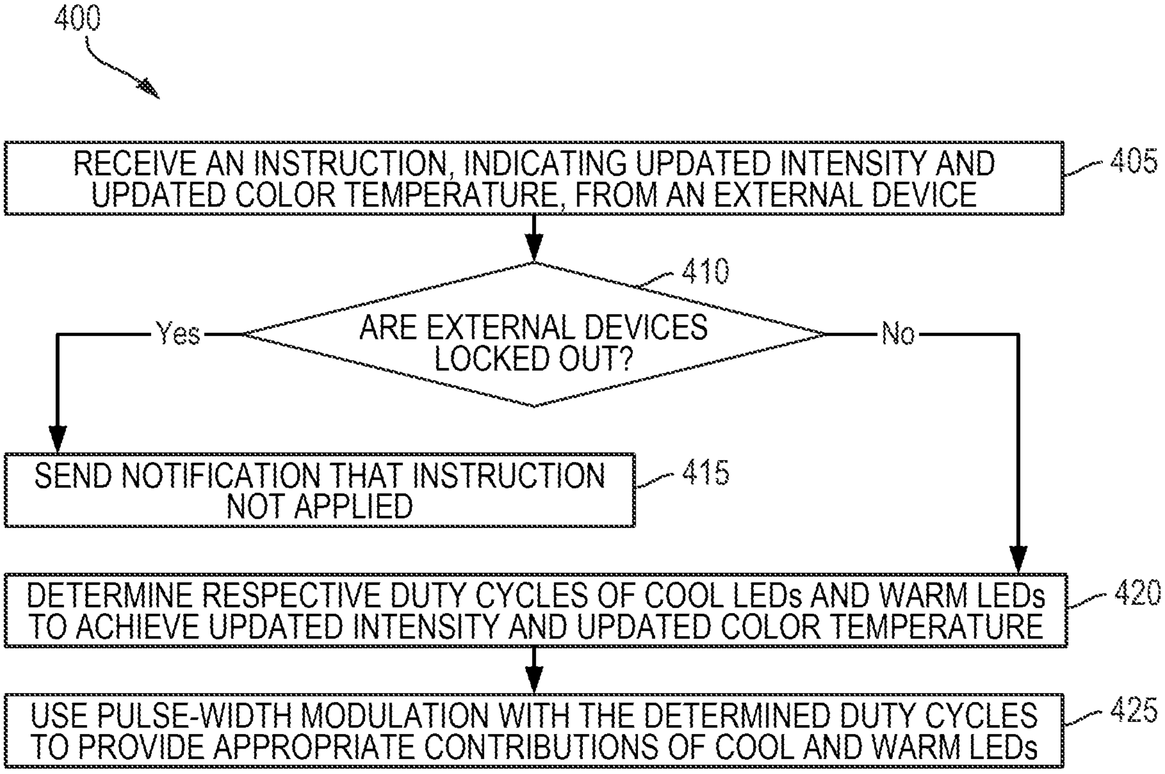
FIG. 4 is a flow diagram of a method of changing a setting of the light fixture based on receiving an instruction to do so via an external device, according to some implementations described herein.

FIG. 4 is a flow diagram of a method 400 of changing a setting of the light fixture 110 based on receiving an instruction to do so via an external device 170, according to some implementations described herein. In some implementations, this method 400 or similar is performed by the processing unit 210 upon use of an external device 170 to change a setting. Further, this method 400 or similar may be performed, upon use of the external device 170 to change a setting, regardless of whether the intensity or color temperature of the light fixture 110 has been previously set via manual control 150 or external device 170.

The method 400 depicted in FIG. 4 may be implemented in software (e.g., firmware), in hardware, or in a combination software and hardware. For instance, if implemented in software, program code implementing the method 400 may be stored in a computer-readable storage medium, which may be non-transitory, for execution by a processing unit, such as the processing unit 210 described herein. If implemented in hardware, the method 400 may be integrated into a specialized hardware device, such as a field-programmable gate array (FPGA). Various implementations are possible and are within the scope of this disclosure. This method 400 is intended to be illustrative and non-limiting. Although FIG. 4 depicts various activities occurring in a particular sequence or order, this is not intended to be limiting. In certain implementations, for instance, the activities may be performed in a different order, or one or more activities of the method 400 may be performed in parallel.

As shown in FIG. 4, at block 405, the processing unit 210 receives an instruction over the radio 130 from an external device 170, where the instruction indicates an updated intensity and updated color temperature for the light fixture 110. For instance, the instruction may have been sent through an application running on the external device 170 and configured to control aspects of the light fixture 110.

At decision block 410, the processing unit 210 determines whether external control has been locked out, thus disallowing updates by external devices 170. To this end, in some implementations, the processing unit 210 may determine whether an electrical characteristic (e.g., current or voltage) is being received over a reset conductor (e.g., a reset wire) that is connected to a reset switch 226. If an electrical characteristic is being received, or if the electrical characteristic) is not being received, dependent on implementation, the processing device 210 determines that external control is allowed and therefore not locked out.

If external control is deemed locked out, then at block 415, the processing unit 210 may initiate sending a notification to the external device 170 indicating that the instruction was rejected and therefore not applied. The radio 130 may transmit this notification back to the external device 170.

However, if external control is deemed not locked out, then at block 420, the processing unit 210 determines respective duty cycles of the cool LEDs 230 and the warm LEDs 240 of the light fixture 110, based on the updated intensity and the updated color temperature indicated in the instruction. In some implementations, the respective duty cycles determine the cool and warm contributions to the light emitted. Although various techniques can be used to determine the respective duty cycles, in some implementations, the processing unit 210 uses a lookup table to map the combination of updated intensity and updated color temperature to respective duty cycles for the set of cool LEDs 230 and for the set of warm LEDs 240.

At block 425, the processing unit 210 may use pulse-width modulation, given the duty cycles for control signals determined at block 420, to send the respective control signals to the cool LEDs 230 and to the warm LEDs 240 to effect a contribution of the cool LEDs 230 and the warm LEDs 240 that achieves the updated intensity and the updated color temperature indicated in the instruction. More specifically, the processing unit 210 varies a first control signal to the cool LEDs 230 in accordance with a first duty cycle associated with the cool LEDs as determined above, and the processing unit 210 varies a second control signal to the warm LEDs 240 in accordance with a second duty cycle associated with the warm LEDs as determined above.

As described above, in some implementations, the processing unit 210 implements pulse-width modulation to achieve specific contributions of cool LEDs 230 and warm LEDs 240. However, additional or alternative techniques can be used to provide a desirable average amount of power output that similarly yields desirable contributions of cool LEDs 230 and warm LEDs 240. Various implementations are possible and are within the scope of this disclosure.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, or additions to the present subject matter as would be readily apparent to one of ordinary skill in the art.

What is claimed is:

1. A method of controlling a light fixture, the method comprising:

receiving a set of inputs via manual control positioned on the light fixture, the set of inputs indicating an intensity and a color temperature for light emitted by the light fixture;

setting a first duty cycle of a first control signal for a first set of light-emitting diodes (LEDs), having a first color temperature, to cause the light fixture to emit light having the intensity and the color temperature;

setting a second duty cycle of a second control signal for a second set of LEDs, having a second color temperature different from the first color temperature, to cause the light fixture to emit light having the intensity and the color temperature;

receiving an external instruction from an external device via a radio, the external instruction indicating an updated intensity and an updated color temperature for light emitted by the light fixture; and overriding the set of inputs with the external instruction by updating the first duty cycle and the second duty cycle to cause the light fixture to emit light having the updated intensity and the updated color temperature.

2. The method of claim 1, wherein receiving the set of inputs via the manual control comprises detecting a change to an electrical state of a conductor connected to the manual control and associated with light intensity.

3. The method of claim 2, further comprising determining the first duty cycle and the second duty cycle as a function of the change to the electrical state of the conductor.

4. The method of claim 3, wherein:

receiving the set of inputs via the manual control further comprises detecting a change to a second electrical state of a second conductor connected to the manual control and associated with light color temperature; and determining the first duty cycle and the second duty cycle is further performed as a function of the change to the second electrical state of the second conductor.

5. The method of claim 1, further comprising receiving an additional set of inputs via the manual control positioned on the light fixture, the additional set of inputs indicating an additional updated intensity and an additional updated color temperature for the light emitted by the light fixture; and overriding the external instruction with the additional set of inputs by updating the first duty cycle and the second duty cycle to cause the light fixture to emit light having the additional updated intensity and the additional updated color temperature.

6. The method of claim 1, wherein:

the updated intensity is higher than the intensity; and overriding the set of inputs by updating the first duty cycle and the second duty cycle comprises increasing a total on-time of the first set of LEDs and the second set of LEDs to cause the light fixture to emit light having the updated intensity.

7. The method of claim 1, wherein overriding the set of inputs by updating the first duty cycle and the second duty cycle comprises modifying a ratio of the first duty cycle and the second duty cycle to cause the light fixture to emit light having the updated color temperature.

8. The method of claim 1, further comprising:

determining that external control is currently allowed; and deciding to override the set of inputs with the external instruction based on external control being currently allowed.

9. The method of claim 8, further comprising:

receiving a lockout instruction to lock out external control;

receiving an additional instruction from the external device via the radio, the additional instruction indicating an additional updated intensity and an additional updated color temperature for the light emitted by the light fixture; and rejecting the additional instruction based on external control being locked out.

10. The method of claim 9, further comprising:

toggling a reset switch in the light fixture responsive to the instruction to lock out external control; and determining that external control is locked out based on a state of the reset switch.

11. A light fixture comprising:

a manual control positioned on the light fixture and configured to receive a set of inputs, the set of inputs indicating an intensity and a color temperature for light emitted by the light fixture;

a first set of light-emitting diodes (LEDs) having a first color temperature;

a second set of LEDs having a second color temperature different from the first color temperature;

a processing unit configured to:

set a first duty cycle of a first control signal for the first set of LEDs to cause the light fixture to emit light having the intensity and the color temperature; and set a second duty cycle of a second control signal for the second set of LEDs to cause the light fixture to emit light having the intensity and the color temperature;

a radio configured to receive an external instruction from an external device via direct wireless communication, the external instruction indicating an updated intensity and an updated color temperature for light emitted by the light fixture; and the processing unit further configured to override the set of inputs with the external instruction by updating the first duty cycle and the second duty cycle to cause the light fixture to emit light having the updated intensity and the updated color temperature.

12. The light fixture of claim 11, wherein:

the manual control is connected to an electrical switch that controls an electrical state of a first conductor associated with light intensity; and the processing unit is configured to detect the set of inputs based on the electrical state of the first conductor.

13. The light fixture of claim 12, wherein:

the manual control is connected to a second electrical switch that controls a second electrical state of a second conductor associated with light color temperature; and the processing unit is configured to detect the set of inputs based on the second electrical state of the second conductor.

14. The light fixture of claim 11, wherein:

the updated intensity is higher than the intensity; and the processing unit is configured to override the set of inputs by increasing a sum of the first duty cycle and the second duty cycle to cause the light fixture to emit light having the updated intensity.

15. The light fixture of claim 11, wherein the processing unit is configured to override the set of inputs by modifying a ratio of the first duty cycle and the second duty cycle to cause the light fixture to emit light having the updated color temperature.

16. The light fixture of claim 11, wherein the direct wireless communication is at least one of Bluetooth Low Energy or Near-Field Communication.

17. A system comprising:

a light fixture comprising:

a manual control positioned on the light fixture and configured to receive a set of inputs, the set of inputs indicating an intensity and a color temperature for light emitted by the light fixture;

a first set of light-emitting diodes (LEDs) having a first color temperature;

a second set of LEDs having a second color temperature different from the first color temperature;

a processing unit configured to:

set a first duty cycle of a first control signal for the first set of LEDs to cause the light fixture to emit light having the intensity and the color temperature; and set a second duty cycle of a second control signal for the second set of LEDs to cause the light fixture to emit light having the intensity and the color temperature;

an instance of an application running on an external device and configured to provide to the light fixture an external instruction, the external instruction indicating an updated intensity and an updated color temperature for light emitted by the light fixture; and the light fixture further comprising:

a radio configured to receive the external instruction from the external device via direct wireless communication;

wherein the processing unit is further configured to override the set of inputs with the external instruction by updating the first duty cycle and the second duty cycle to cause the light fixture to emit light having the updated intensity and the updated color temperature.

18. The system of claim 17, wherein:

the instance of the application is configured to provide a lockout instruction to lock out external control of the light fixture; and the light fixture is configured to toggle a reset switch of the light fixture responsive to the lockout instruction, wherein the reset switch indicates to the processing unit that external control is disallowed.

19. The system of claim 18, further comprising an additional instance of the application running on an additional external device, wherein the additional instance of the application is configured to:

provide to the light fixture an additional instruction, the additional instruction indicating an additional updated intensity and an additional updated color temperature for light emitted by the light fixture; and receive from the light fixture a rejection of the additional instruction, based on external control of the light fixture being locked out.

20. The system of claim 17, wherein the direct wireless communication is at least one of Bluetooth Low Energy or Near-Field Communication.

* * * * *